UNITED STATES PATENT OFFICE.

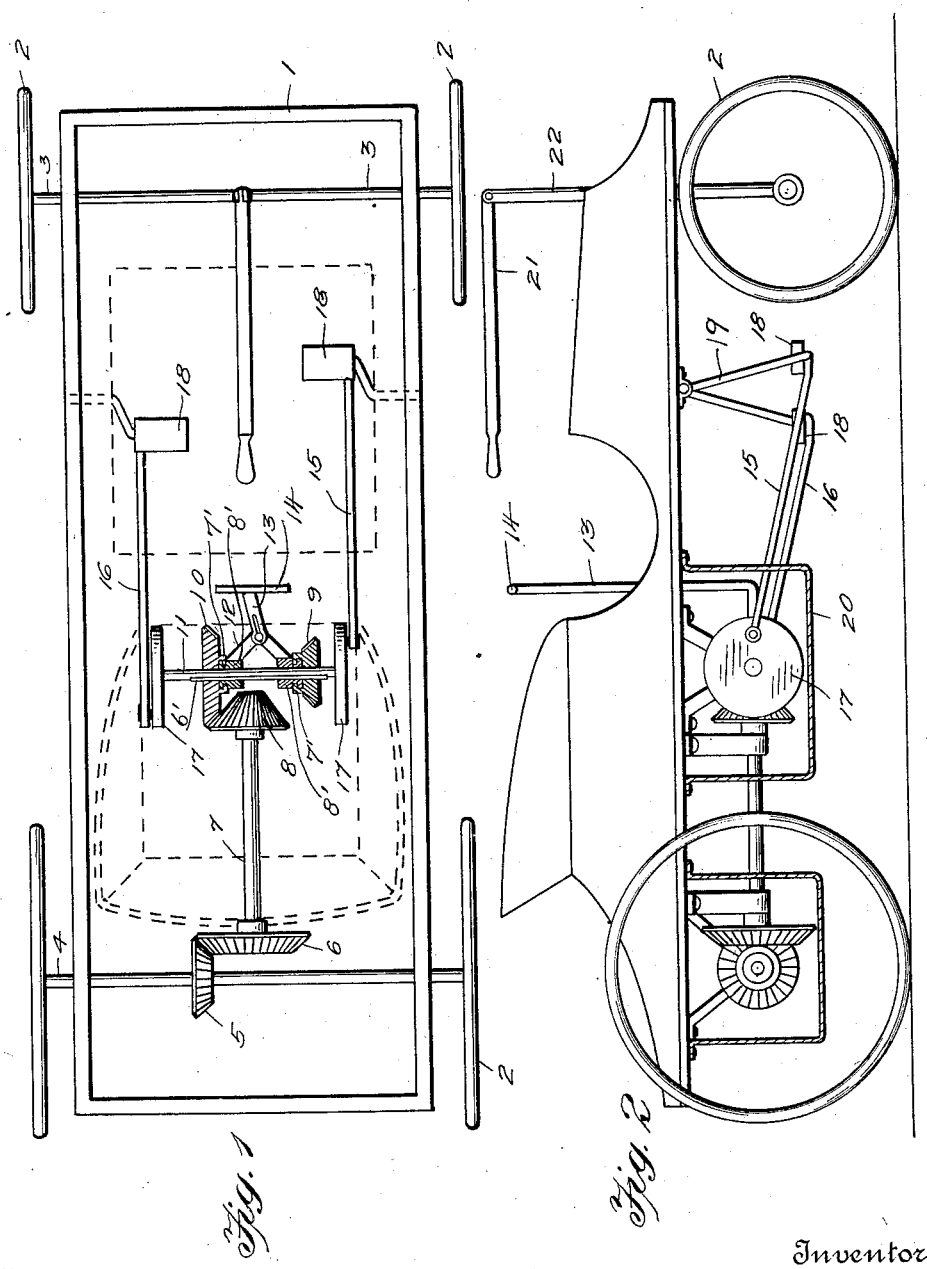

GUSTAVE LORENZ, OF CINCINNATI, OHIO.

GEARING.

1,097,342.  Specification of Letters Patent.  Patented May 19, 1914.

Application filed August 1, 1910. Serial No. 574,950.

*To all whom it may concern:*

Be it known that I, GUSTAVE LORENZ, citizen of the United States, residing at Cincinnati, in the county of Hamilton and State of Ohio, have invented certain new and useful Improvements in Gearing, of which the following is a specification.

This invention relates to improvements in toy vehicles for juveniles and embraces the construction of a gear driven vehicle having shifting gears for increasing and decreasing the speed of the machine or vehicle during its travel.

One of the objects of the improved device is the construction of means whereby the speed of a vehicle may be easily and quickly changed, which will be simple of design and operation.

With the above and other objects in view the improved device embraces certain combinations, constructions and arrangements of parts, clearly illustrated in the accompanying drawings, in which, Figure 1 is a plan view of the vehicle, with the top board or platform removed. Fig. 2 is a side elevation thereof.

Referring to the accompanying drawings illustrating the invention 1 denotes the frame of the vehicle, which is supported on the wheels 2, by the front and rear axles 3 and 4 respectively. The rear axle 4 is provided with a fixed bevel gear 5 which is engaged by the gear 6, mounted on the rear end of the rod or shaft 7. The forward end of this rod or shaft is provided with a bevel gear 8. The bevel gear 8 is positioned between two shifting gears 9 and 10, which have annular portions 7' revoluble in corresponding grooves formed in the collars 8', said collars and gears being slidable on the spline 6' of the shaft 11. The gear 9 is considerably smaller than the gear 10 and is used when it is desired to propel the vehicle at its lowest speed. The collars 8' of the gears 9 and 10 are connected to the links 12 which are in turn pivoted to the bifurcated end of the lever 13, the upper end of which projects above the car or frame 1, and on which a handle 14 is mounted. By rocking the lever 13 the small gear may be moved toward or away from the fixed gear 8, as is the case also of the large gear 10, thereby increasing the speed of the gear wheel 5, on the rear axle, when the vehicle is propelled.

In order to propel the vehicle, drive rods 15 and 16 are pivoted to the disks 17, which are mounted on the outer ends of the rod or shaft 11. The forward ends of the rods 15 and 16 are provided with pedals 18 and are supported by the cranks 19 on the car or frame 1. By horizontally moving the pedals and the rods 15 and 16 the shaft 11 may be rotated and motion imparted to the rear axle and the vehicle driven or propelled over the road. The shifting gears are inclosed by the housing or boxing 20.

Having described my invention I claim:—

In combination a shaft, two gear wheels on said shaft, a gear wheel at right angles to said shaft and arranged to mesh with either of said first-named gear wheels, a V-shaped member, having collars integral therewith, said collars sliding on said shaft and being revolubly connected to said gear wheels, a crank arm pivoted at one end to the apex portion of said V-shaped member, and an upright post integrally formed upon said crank and arranged to operate the same.

In testimony whereof I affix my signature in presence of two witnesses.

GUSTAVE LORENZ.

Witnesses:
 HARRY A. RUST,
 MARY RUST.

Copies of this patent may be obtained for five cents each, by addressing the "Commissioner of Patents, Washington, D. C."